United States Patent
Tagami

(10) Patent No.: US 7,487,696 B2
(45) Date of Patent: Feb. 10, 2009

(54) DRIVING FORCE INTERRUPTING MECHANISM

(75) Inventor: Takuya Tagami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 11/349,271

(22) Filed: Feb. 8, 2006

(65) Prior Publication Data

US 2006/0174723 A1 Aug. 10, 2006

(30) Foreign Application Priority Data

Feb. 9, 2005 (JP) .............................. 2005-033528

(51) Int. Cl.
*F16H 59/02* (2006.01)
(52) U.S. Cl. .................... 74/665 F; 74/335; 74/473.36; 192/109 R; 192/99 S
(58) Field of Classification Search ............... 74/665 F, 74/473.36, 473.37; 192/69.9
See application file for complete search history.

(56) References Cited

U.S. PATENT DOCUMENTS 4,524,856 A * 6/1985 Renaud ..................... 192/98
4,688,447 A * 8/1987 Dick ......................... 74/665 T
5,199,325 A * 4/1993 Reuter et al. ................ 74/335

FOREIGN PATENT DOCUMENTS

JP 1-289724 A 11/1989

* cited by examiner

*Primary Examiner*—Sherry L Estremsky
*Assistant Examiner*—Edwin A Young
(74) *Attorney, Agent, or Firm*—Birch, Stewart, Kolasch & Birch, LLP

(57) ABSTRACT

A driving force interrupting mechanism for interrupting a driving force to a driving shaft. The mechanism includes a spindle rotatably attached to a first housing body for supporting the driving shaft so that the driving shaft can be rotated, a fork attached to the spindle so that the fork can be swung, and a lost motion mechanism that renders further rotation of the spindle to be ineffective in swinging the fork when the spindle is rotated and the fork is swung to a predetermined position in which an input shaft and an output shaft are coupled is provided on the spindle. The resulting configuration is compact and cost effective.

20 Claims, 14 Drawing Sheets

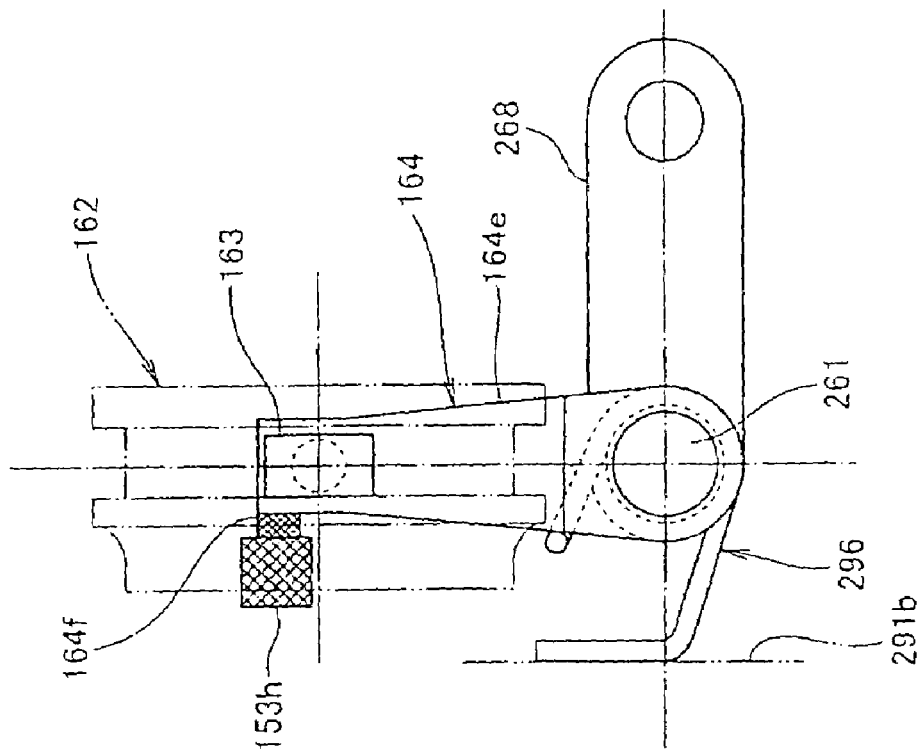
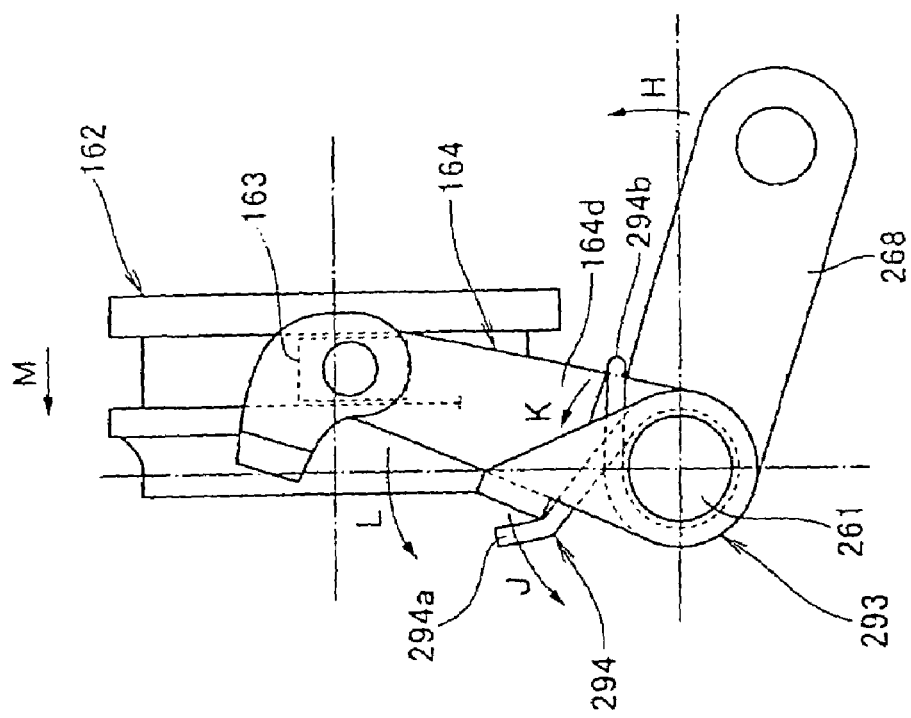
FIG. 13(B)
FIG. 13(A)

US 7,487,696 B2

DRIVING FORCE INTERRUPTING MECHANISM

CROSS-REFERENCE TO RELATED APPLICATION

The present application claims priority under 35 U.S.C. §119 to Japanese Patent Application No. 2005-033528, filed Feb. 9, 2005, the entire contents of which are hereby incorporated by reference.

BACKGROUND OF THE INVENTION

1. Field of the Invention

The present invention relates to the improvement of a driving force interrupting mechanism.

2. Description of Background Art

As a driving force interrupting mechanism for interrupting driving force to one of the front-wheel side and the rear-wheel side in a state in which driving force can be transmitted to the other of the front-wheel side and the rear-wheel side to switch a four-wheel-drive state and a two-wheel-drive state in a conventional type four-wheel drive vehicle, a hub clutch is known (for example, refer to JP-A No. 289724/1989).

FIG. 1A of JP-A No. 289724/1989 will be described below. Reference numerals in the patent application are used as they are.

An axle 1 is a member which is fitted to a spindle 27 as the spindle can be rotated and to the end of which a driving gear 3 is coupled via a spline.

A housing 5 is arranged so that the housing encircles the axle 1 and the driving gear 3, is attached to the spindle 27 so that the spindle can be rotated, a wheel 15 is attached to a hub 9, a slide gear 55 is connected to an inner face of the housing 5 via a spline and is attached so that the slide gear can be axially moved.

The axle 1 and the wheel 15 are coupled or the axle 1 and the wheel 15 are uncoupled by coupling or uncoupling the driving gear 3 and the slide gear 55.

The slide gear 55 is pressed in a direction in which the slide gear and the driving gear 3 are coupled by a shift spring 65 and is pressed in a direction in which the slide gear and the driving gear 3 are uncoupled by a piston member 69 and a return spring 85.

In the above-mentioned technique, as the shift spring 65, the piston member 69 and the return spring 85 are required to move the slide gear 55, structure for connecting or disconnecting a power transmission path is made complex, large space is occupied, the cost of the driving force interrupting mechanism is increased, and the driving force interrupting mechanism is large-sized.

SUMMARY AND OBJECTS OF THE INVENTION

The object of the invention is to provide a driving force interrupting mechanism the increase of the cost of which is inhibited and which is miniaturized and compacted.

According to a first aspect of the invention, a driving force interrupting mechanism is provided where a driving shaft for transmitting driving force to the front-wheel side or the rear-wheel side is coupled to a driving source of a vehicle, and the driving shaft is configured by an input shaft and an output shaft coaxial with the input shaft. In addition, a coupling sleeve is coupled to one of the input shaft and the output shaft so that the coupling sleeve can be axially moved is moved by a fork so that the coupling sleeve is also coupled to the other of the input shaft and the output shaft. The driving force is transmitted by coupling the input shaft and the output shaft via the coupling sleeve. In addition, the driving force is disconnected by uncoupling the coupling sleeve from the other of the input shaft and the output shaft. A swinging shaft is rotatably attached to a housing for supporting the driving shaft so that the driving shaft can be rotated, and the fork is attached to the swinging shaft so that the fork can be swung. Further, a lost motion mechanism that renders the further rotation of the swinging shaft to be ineffective in swinging the fork when the swinging shaft is rotated and the fork is swung to a predetermined position in which the input shaft and the output shaft are coupled is provided on the swinging shaft.

Cost increases can be minimized by making the driving force interrupting mechanism depend upon a swing of the fork. Further, the driving force interrupting mechanism is miniaturized and compact, thereby reducing the size of the space occupied by the lost motion mechanism.

According to a second aspect of the invention, the lost motion mechanism is preferably provided with a spring between the swinging shaft and the fork for pressing the fork on the side of the predetermined position by coupling one end to the swinging shaft and touching the other end to a face on the reverse side to the predetermined position of the fork. Also provided is a stopper member attached to the swinging shaft to regulate a swing to the side of the predetermined position of the fork, and a spring between the stopper and the housing for pressing the stopper member on the reverse side to the predetermined position by touching one end to a face on the side of the predetermined position of the stopper member and touching the other end to an inner wall of the housing.

The fork is pressed on the side of the predetermined position by the spring between the swinging shaft and the fork together with the swinging shaft, a swing to the side of the predetermined position of the fork is regulated by the stopper member attached to the swinging shaft, and the stopper member is pressed on the reverse side to the predetermined position by the spring between the stopper and the housing.

When the swinging shaft is rotated in a state in which the fork is pressed on the side of the predetermined position by the resilience of the spring between the swinging shaft and the fork together with the swinging shaft and is pressed on the stopper member, the fork is swung to the side of the predetermined position against the resilience of the spring between the stopper and the housing. At this time, when torque continues to be applied to the swinging shaft, even if a swing of the fork is stopped in the predetermined position by a member on the side of the housing, the stopper member is further swung in the same direction together with the swinging shaft. That is, a lost motion that has no effect upon the swing of the fork is caused for the swinging shaft and the stopper member.

When the application of torque to the swinging shaft is stopped, the fork is swung to the reverse side to the predetermined position by the resilience of the spring between the stopper and the housing.

According to a third aspect of the invention, the lost motion mechanism is preferably provided with a stopper member attached to the swinging shaft to regulate a swing to the side of the predetermined position of the fork. Also provided are a spring between the stopper and the fork for pressing the fork on the side of the predetermined position when the stopper member is swung to the side of the predetermined position by touching one end to a face on the side of the predetermined position of the stopper member and coupling the other end to the fork, and a spring between the fork and the housing for pressing the fork on the reverse side to the predetermined position by touching one end to a face on the side of the predetermined position of the fork and touching the other end to an inner wall of the housing.

When the stopper member in a state in which a swing to the side of the predetermined position of the fork is regulated is swung to the side of the predetermined position, the fork is pressed on the side of the predetermined position by the spring between the stopper and the fork, and the fork is pressed on the reverse side to the predetermined position by the spring between the fork and housing.

When the stopper member is swung to the side of the predetermined position integrally with the swing shaft, the fork is swung to the side of the predetermined position which is the same direction as the stopper member via the spring between the stopper and the fork by the swing of the stopper member against the resilience of the spring between the fork and the housing. At this time, even if a swing of the fork is stopped in the predetermined position by a member on the side of the housing, the stopper member is swung to the side of the predetermined position apart from the fork together with the swinging shaft. That is, a lost motion that has no effect upon the swing of the fork is caused for the swinging shaft and the stopper member.

When the application of torque to the swinging shaft is stopped, the fork is swung to the reverse side to the predetermined position by the resilience of the spring between the stopper and the fork and the spring between the fork and the housing.

According to the first aspect of the invention, since the lost motion mechanism is provided on the swinging shaft supporting the fork so that the fork can be swung and attached to the housing so that the swinging shaft can be rotated, cost increases can be avoided by making the driving force interrupting mechanism depend upon a swing of the fork. Further, since the driving force interruption mechanism is miniature and compact, the space occupied by the driving force interrupting mechanism can be reduced.

According to the second aspect o the invention, the lost motion mechanism is provided with the spring between the swinging shaft and the fork, the stopper member and the spring between the stopper and the housing, the swinging shaft is pressed by the spring between the swinging shaft and the fork so that the fork hits on the stopper member and the stopper member is pressed on the housing by the spring between the stopper and the housing, the resilience of the spring between the swinging shaft and the fork and the resilience of the spring between the stopper and the housing are independent on the boundary of the stopper member, as they have no effect upon each other. As a result, the resilience of the respective springs can be separately designed, and a degree of freedom in designing the driving force interrupting mechanism can be enhanced.

According to the third aspect of the invention, the lost motion mechanism is provided with the stopper member, the spring between the stopper and the fork, and the spring between the fork and the housing. However, none of the ends of the spring between the stopper and the fork and the spring between the fork and the housing is fixed to the swinging shaft. Thus, no groove, no hole, no cutout, no pin and no projection need to be provided to the swinging shaft. As a result, the swinging shaft can be formed in a simple straight shape, and the lost motion mechanism can be formed in simple structure. Therefore, the manufacturing cost of the lost motion mechanism can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 13A an 13B show the first action of the driving force interrupting mechanism (the second embodiment) according to the invention.

DETAILED DESCRIPTION OF THE PREFERRED EMBODIMENTS

Figure 1:
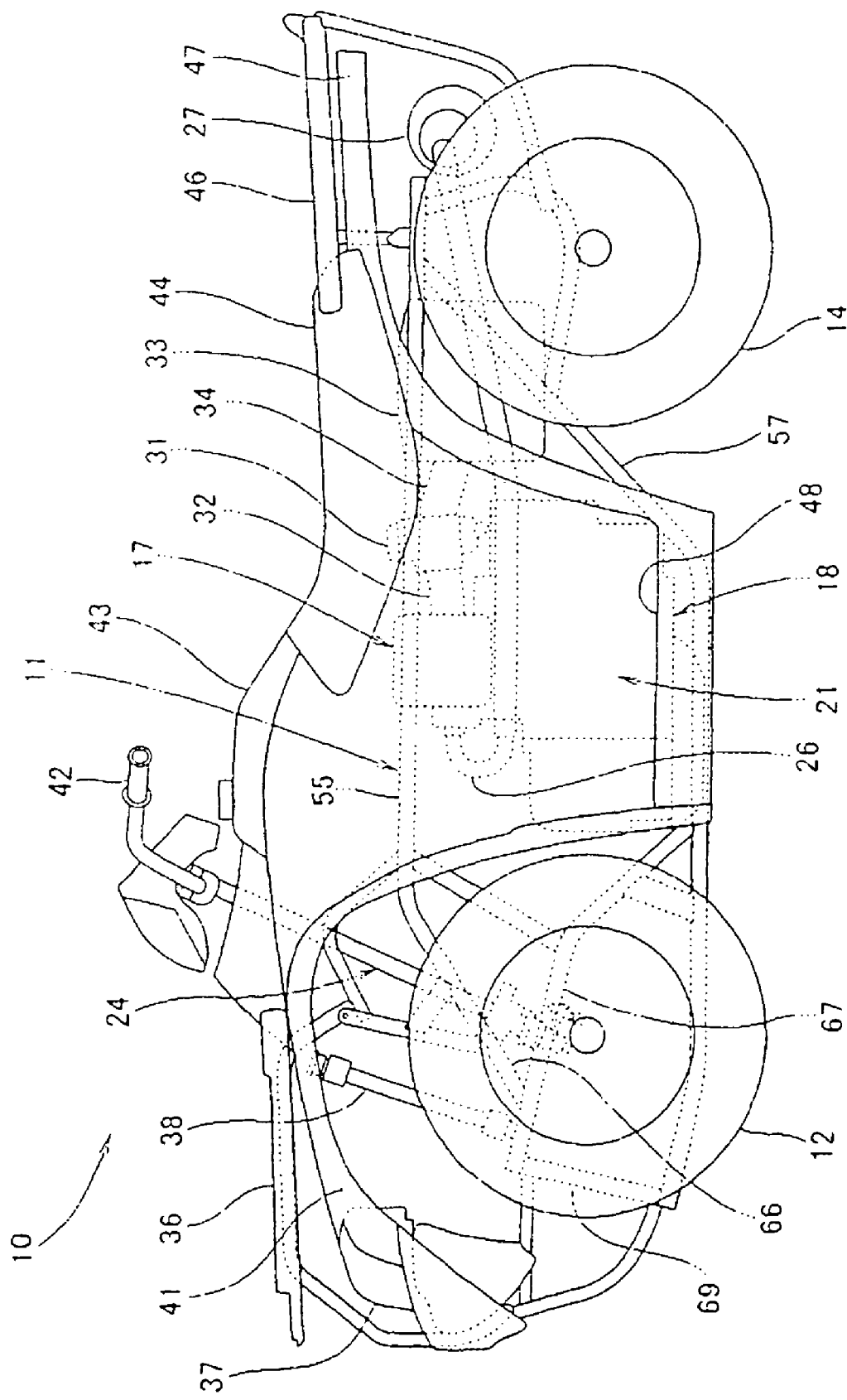
FIG. 1 is a side view showing a vehicle provided with a driving force interrupting mechanism according to the invention.

FIG. 1 is a side view showing a vehicle provided with a driving force interrupting mechanism according to the invention, and a vehicle 10 for running on an uneven road as a vehicle is a part time four-wheel drive vehicle where a pair of left and right front wheels 12, 13 (only a reference numeral 12 on this side is shown) are attached to the front of a body frame 11 via a suspension arm not shown, a pair of left and right rear wheels 14, 15 (only a reference numeral 14 on this side is shown) are attached to the rear of the body frame 11 via a suspension arm not shown, a power unit 21 including an engine 17 and a transmission 18 is attached to the center of the body frame 11 and the front wheels 12, 13 and the rear wheels 14, 15 can be driven by the power unit 21 or only the rear wheels 14, 15 can be driven by the power unit.

Also shown are an exhaust pipe 26 extended backward from the front of the engine 17, a muffler 27 connected to the rear end of the exhaust pipe 26, a carburetor 31 connected to the rear of the engine 17 via an intake pipe 32, an air cleaner 32 connected to the carburetor 31 via a connecting tube 34, a front carrier 36, a headlamp 37, a radiator 38, a front fender 41, a handlebar 42, a fuel tank 43, a seat 44, a rear carrier 46, a rear fender 47, and a step 48.

The body frame 11 is provided with a pair of left and right upper main frames 55, 56 (only a reference numeral 55 on this side is shown) extended longitudinally, a pair of left and right lower main frames 57, 58 (only a reference numeral 57 on this side is shown) arranged under the upper main frames 55, 56 and coupled to the rear ends of the upper main frames 55, 56, a pair of left and right front inclined parts 66, 66 (only a reference numeral 66 on this side is shown) provided to the fronts of the upper main frames 55, 56, a pair of left and right first inclined frames 67, 67 (only a reference numeral 67 on this side is shown) coupled to the front inclined parts 66, 66 and coupled to the lower main frames 57, 58 and a pair of left and right coupling frames 69, 69 for coupling each end of the first inclined frames 67, 67 and each end of the lower main frames 57, 58.

Figure 2:
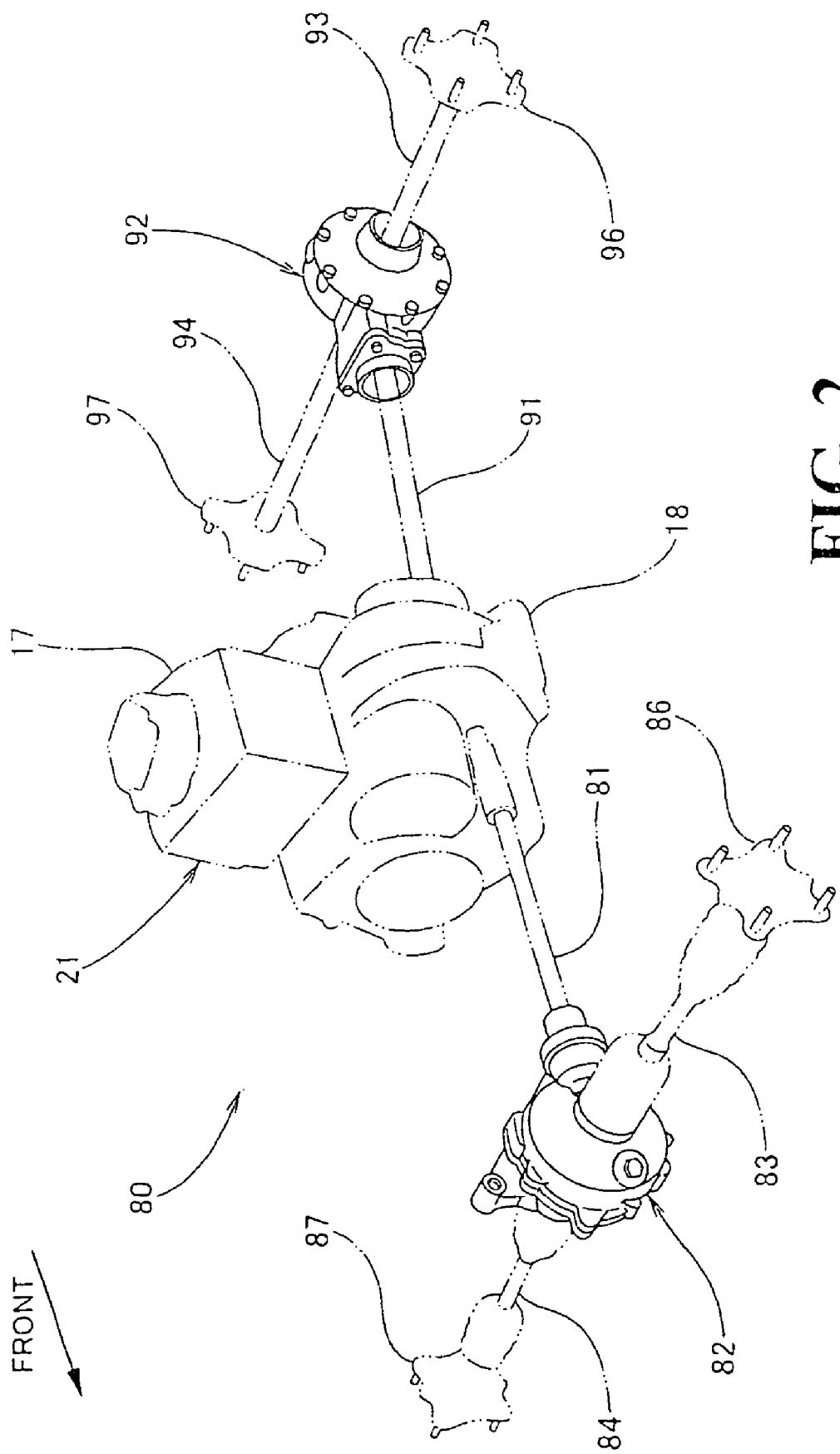
FIG. 2 is a perspective view showing a power transmission mechanism of the vehicle according to the invention.

FIG. 2 is a perspective view showing a power transmission mechanism of the vehicle according to the invention and an arrow (FRONT) in FIG. 2 shows the front of the vehicle.

The power transmission mechanism 80 includes a front propeller shaft 81 extended forward from a lower part of the power unit 21, a front final assembly 82 coupled to the end of the front propeller shaft 81, front drive shafts 83, 84 coupled to the left and the right of the front final assembly 82, hubs 86, 87 coupled to the respective ends of the front drive shafts 83, 84, a rear propeller shaft 91 extended backward from the lower part of the power unit 21, a rear final assembly 92 coupled to the rear end of the rear propeller shaft 91, rear drive shafts 93, 94 coupled to the left and the right of the rear final assembly 92 and hubs 96, 97 coupled to the respective ends of the rear drive shafts 93, 94.

The hubs 86, 87, 96, 97 are members for attaching the front wheel 12 shown in FIG. 1, the front wheel 13 (not shown), the rear wheel 14 shown in FIG. 1 and the rear-wheel 15 (not shown).

Figure 3:
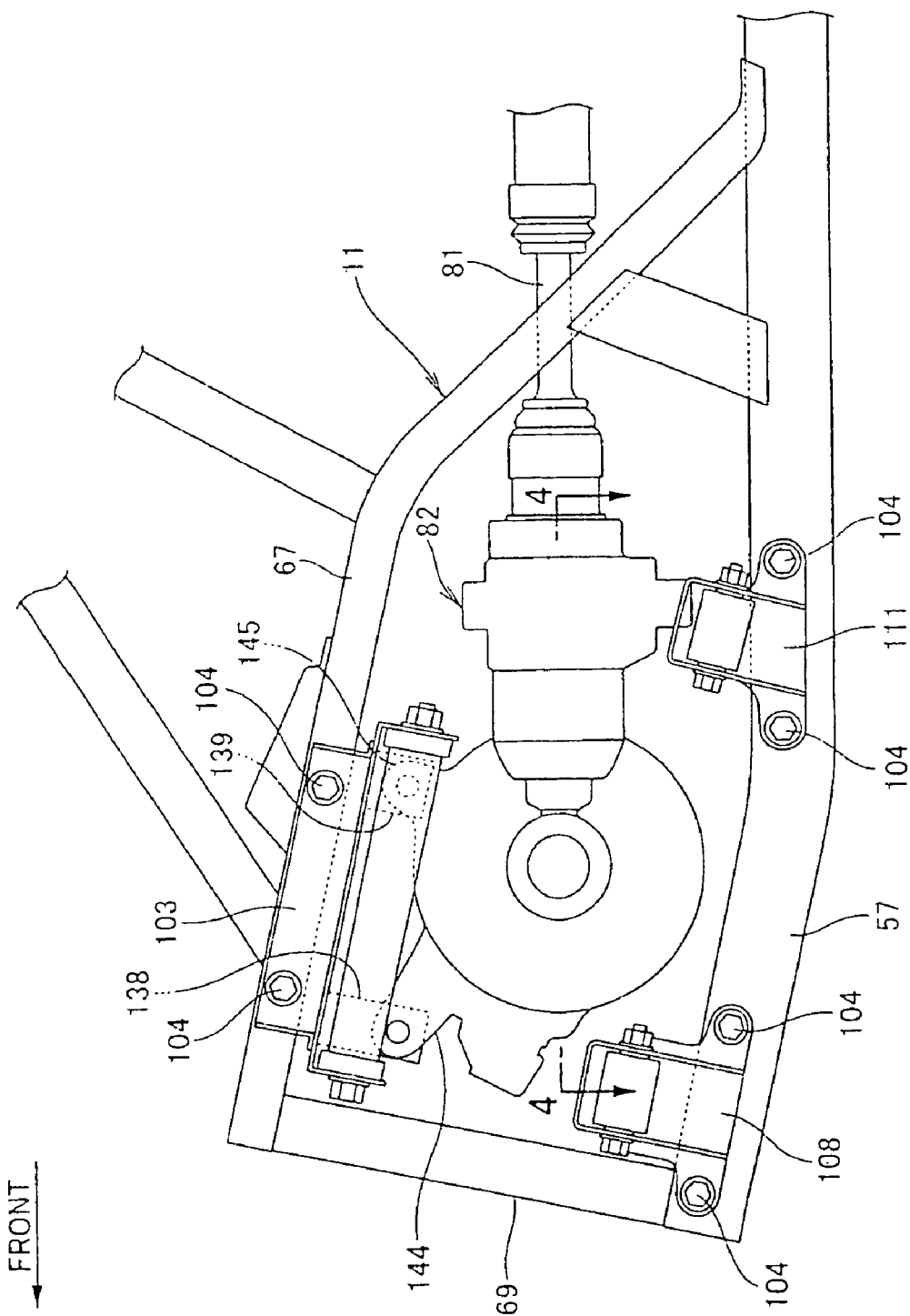
FIG. 3 is a side view showing suspension mounting structure of the vehicle according to the invention.

FIG. 3 is a side view showing suspension mounting structure of the vehicle according to the invention and shows that the front final assembly 82 is fixed to the body frame 11 by attaching upper brackets 103 for supporting respective upper arms as a suspension arm to the respective front ends of the first inclined frames 67, 67 (only the reference numeral 67 on this side is shown) by plural bolts 104, attaching each lower front bracket 108 and each lower rear bracket 111 for supporting respective lower arms as a suspension arm to the respective front ends of the lower main frames 57, 58 (only the reference numeral 57 on this side is shown) by respective plural bolts 104, providing downward protruded parts 138, 139 to the upper bracket 103, providing upper attachments 144, 145 to the front final assembly 82, attaching the upper attachment 144 to the downward protruded part 138 and attaching the upper attachment 145 to the downward protruded part 139.

Figure 4:
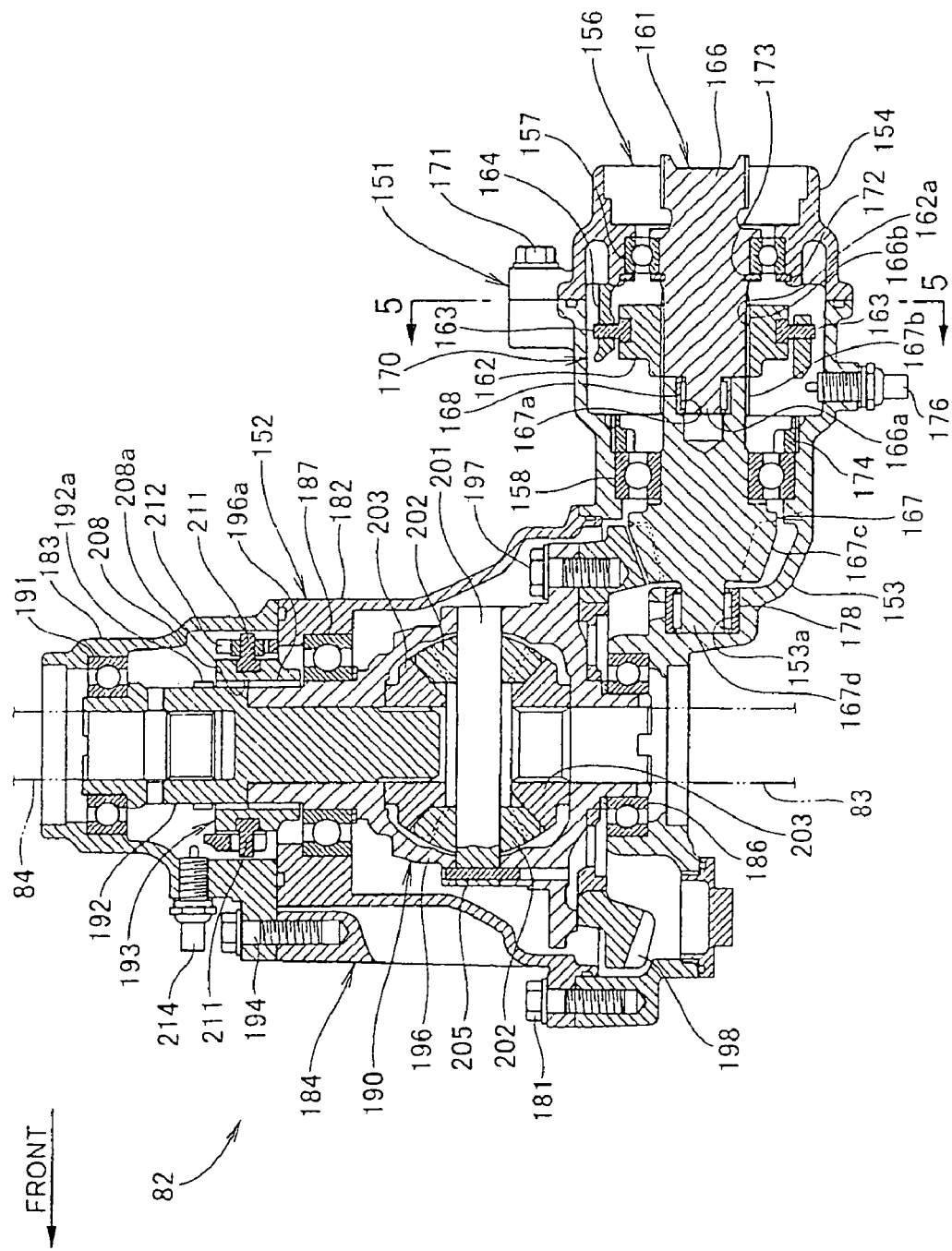
FIG. 4 is a sectional view viewed along a line 4-4 shown in FIG. 3.

FIG. 4 is a sectional view viewed along a line 4-4 shown in FIG. 3, the front final assembly 82 is a final reduction gear unit configured by an input side mechanism 151 and an output side mechanism 152 integrally coupled to the input side mechanism 151, and a lost motion mechanism according to the invention is provided to the input side mechanism 151.

The input side mechanism 151 is provided with a first housing 156 configured by a first housing body 153 and a first housing cover 154 for covering the side of one end of the first housing body 153, a driving shaft 161 supported by the first housing 156 via bearings 157, 158 so that the driving shaft can be rotated, a coupling sleeve 162 coupled to the driving shaft 161 via splines and attached so that the coupling sleeve can be axially moved, and a fork 164 for axially moving the coupling sleeve 162 via coupling pieces 163, 163.

The driving shaft 161 is configured by an input shaft 166 coupled to the side of the front propeller shaft 81 (see FIG. 2) and an output shaft 167 arranged coaxially with the input shaft 166, a small-diameter convex portion 166a is formed at the end of the input shaft 166, a fitting hole 167a is formed at the end of the output shaft 167, and the small-diameter convex portion 166a is fitted into the fitting hole 167 via a needle bearing 168 so that the small-diameter convex portion can be turned.

The input shaft 166 is a member on which a male spline 166b for mating a female spline 162a formed on the coupling sleeve 162 is formed.

The output shaft 167 is a member on which a male spline 167b for mating the female spline 162a of the coupling sleeve 162 is formed and with the end of which a small bevel gear 167c and a small-diameter convex portion 167d fitted into a fitting concave portion 153a of the first housing body 153 via a needle bearing 178 so that the small-diameter convex portion can be turned are integrated.

The coupling sleeve 162, the coupling pieces 163, 163 and the fork 164 are members for transmitting driving force from the input shaft 166 to the output shaft 167 or for forming a part of a driving force interrupting mechanism 170 for interrupting driving force, and the driving force interrupting mechanism 170 is provided with the lost motion mechanism described later.

Also shown are a bolt 171 for attaching the first housing cover 154 to the first housing body 153, a snap ring 172 for fixing the bearing 157 to the first housing cover 154, a snap ring 173 for fixing the bearing 157 to the input shaft 166, a lock nut 174 for fixing the bearing 158 to the first housing body 153, and a position detecting switch 176 for detecting a position of the coupling sleeve 162 via the fork 164.

The output side mechanism 152 is configured by a second housing 184 formed by a second housing body 182 connected to the first housing body 153 by a bolt 181 and a second housing cover 183 covering the side of one end of the second housing body 182, differential gears 190 supported by the second housing body 182 via bearings 186, 187 so that the differential gears can be turned, an intermediate shaft 192 coupled to the differential gears 190 and supported by the second housing cover 183 via a bearing 191 so that the intermediate shaft can be rotated and a differential locking device 193 for differential locking by integrally coupling the differential gears 190 and the intermediate shaft 192. A reference numeral 194 denotes a bolt for attaching the second housing cover 183 to the second housing body 182.

The differential gears 190 are configured by a differential case 196, a large bevel gear 198 engaged with the small bevel gear 167c of the output shaft 167 by attaching the large bevel gear to the end of the differential case 196 by a bolt 197, a gear shaft 201 attached to the differential case 196 so that the gear shaft pierces the differential case, differential small bevel gears 202, 202 attached to the gear shaft 201 so that the differential small bevel gears can be turned, and differential large bevel gears 203, 203 engaged with the differential small bevel gears 202, 202. A pin 205 is provided for fixing the gear shaft 201 to the differential case 196.

One differential large bevel gear 203 is connected to the end of the front drive shaft 83 via splines and the other differential large bevel gear 203 is connected to one end of the intermediate shaft 192 via splines. The other end of the intermediate shaft 192 is connected to the end of the front drive shaft 84 via splines.

The differential locking device 193 is provided with a sleeve 208 mated to a male spline 196a formed at the end of the differential case 196 and a male spline 192a formed on the intermediate shaft 192 so that the sleeve can be axially moved and a fork 212 for moving the sleeve 208 via coupling pieces 211, 211, the differential case 196 and the intermediate shaft 192 are integrally rotated by constantly mating a female spline 208a formed on the sleeve 208 to the male spline 196a of the differential case 196 and also mating the female spline to the male spline 192a of the intermediate shaft 192 when the sleeve 208 is moved by the fork 212, that is, a differential lock is activated, differential operation for the front drive shafts 83, 84 is locked, and the front drive shafts are integrally rotated. A position detecting switch 214 is provided for detecting a position of the sleeve 208 via the fork 212.

The above-mentioned driving force interrupting mechanism 170 is a driving force switching mechanism that couples the side of the engine 17 (see FIG. 1) which is a driving source and the front two wheels by coupling the input shaft 166 and the output shaft 167, and turns into a state of four-wheel-drive in which the front two wheels and the rear two wheels are driven. Further, driving force interrupting mechanism 170 is a driving force switching mechanism that disconnects coupling between the side of the engine 17 and the front two wheels by detaching the input shaft 166 and the output shaft 167 and turns into a state of two-wheel-drive in which only the rear two wheels are driven. That is, the force interrupting mechanism 170 switches between the four-wheel-drive state and the two-wheel-drive state.

Figure 5:
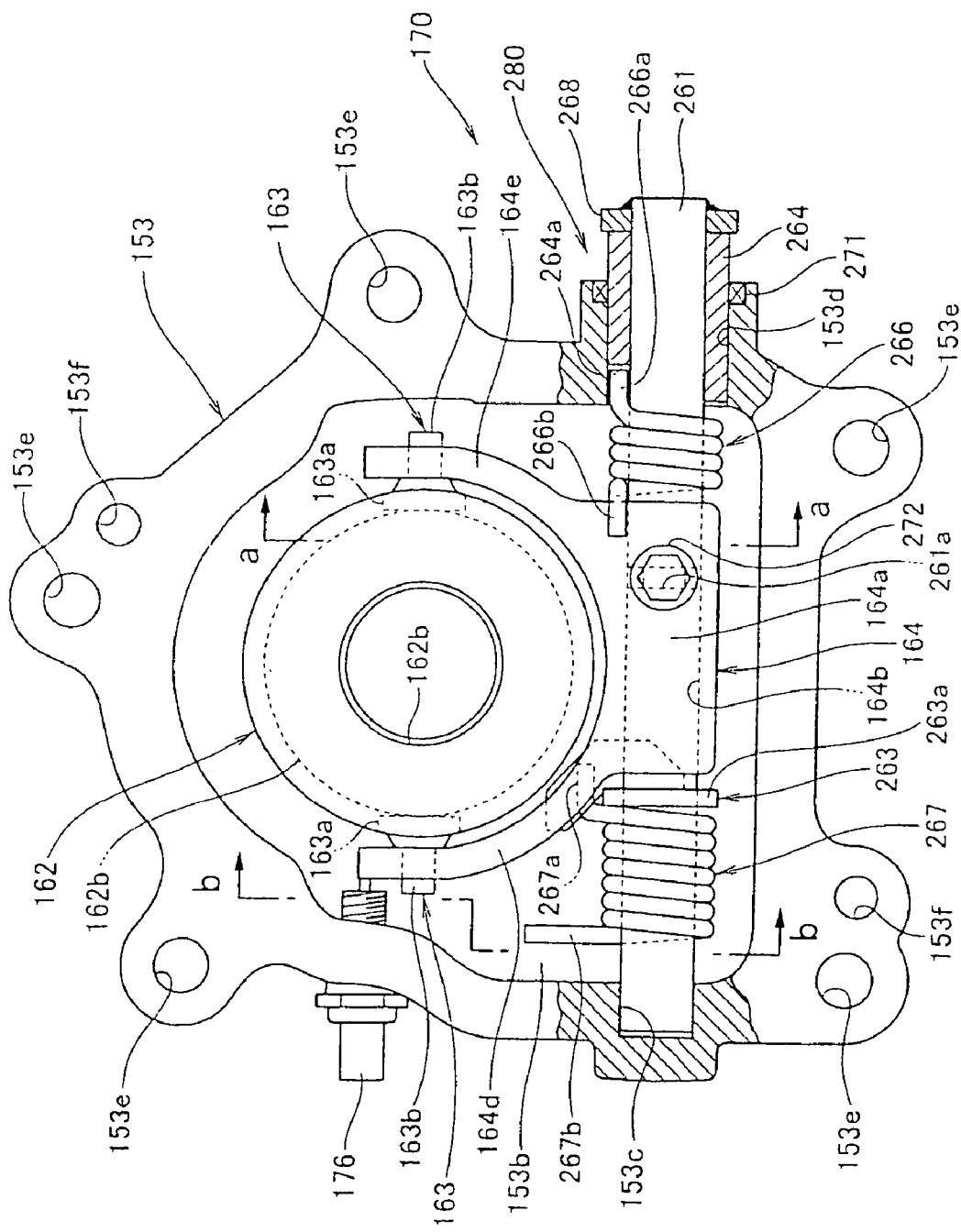
FIG. 5 is a back view showing a driving force interrupting mechanism (a first embodiment) according to the invention.

FIG. 5 is a back view showing the driving force interrupting mechanism (a first embodiment) according to the invention and shows a section viewed along a line 5-5 shown in FIG. 4.

The driving force interrupting mechanism 170 is configured by a spindle 261 attached to the first housing body 153 so that the spindle can be rotated, and the fork 164 attached to the spindle 261 so that the fork can be swung. A stopper member 263 is integrated with the spindle 261 for regulating a swing in a first swing direction of the fork 164 (that is, in a swing direction of the fork 164 that moves the coupling sleeve 162 to couple the input shaft 166 (see FIG. 4) and the output shaft 167 (see FIG. 4)), and a collar 264 is attached to the end of the spindle 261.

A first helical torsion spring 266 is fitted to the spindle 261 by hooking one end on a cutout 264a provided to the collar 264 and hooking the other end on the back 164a of the fork 164 (in the first embodiment and a second embodiment described later. The first swing direction is equivalent to a forward direction of the fork 164, and an inside face of the fork 164 is equivalent to the front, and a face on this side of the fork 164 is equivalent to the back).

A second helical torsion spring 267 is fitted to the spindle 261 by hooking one end to the front of the stopper member 263 and touching the other end to the inner wall 153b of the first housing body 153, a lever 268 attached to the end of the spindle 261, the above-mentioned coupling pieces 163, 163 and the coupling sleeve 162.

The coupling piece 163 is configured by a rectangular piece 163a inserted into a peripheral annular groove 162b provided to the periphery of the coupling sleeve 162 and a shank 163b integrally extended from the rectangular piece 163a, and the shank 163b is attached to the fork 164 so that the shank can be rotated.

The fork 164 is provided with a first arm 164d and a second arm 164e for supporting the coupling pieces 163, 163.

Also illustrated are a hole 153c, 153d made in the first housing body 153 to support the spindle 261 or the collar 264, bolt insertion holes 153e for inserting the bolt 171 (see FIG. 4) for fastening the first housing body 153 and the first housing cover 154 (see FIG. 4), a hole 153f, 153f for inserting a dowel pin for positioning the first housing body 153 and the first housing cover 154, a spindle insertion hole 164b made in the fork 164 to insert the spindle 261, a flange part 263a provided to the stopper member 263, an oil seal 271, and a bolt 272 for regulating the axial movement of the fork 164 for the spindle 261.

Figure 6:
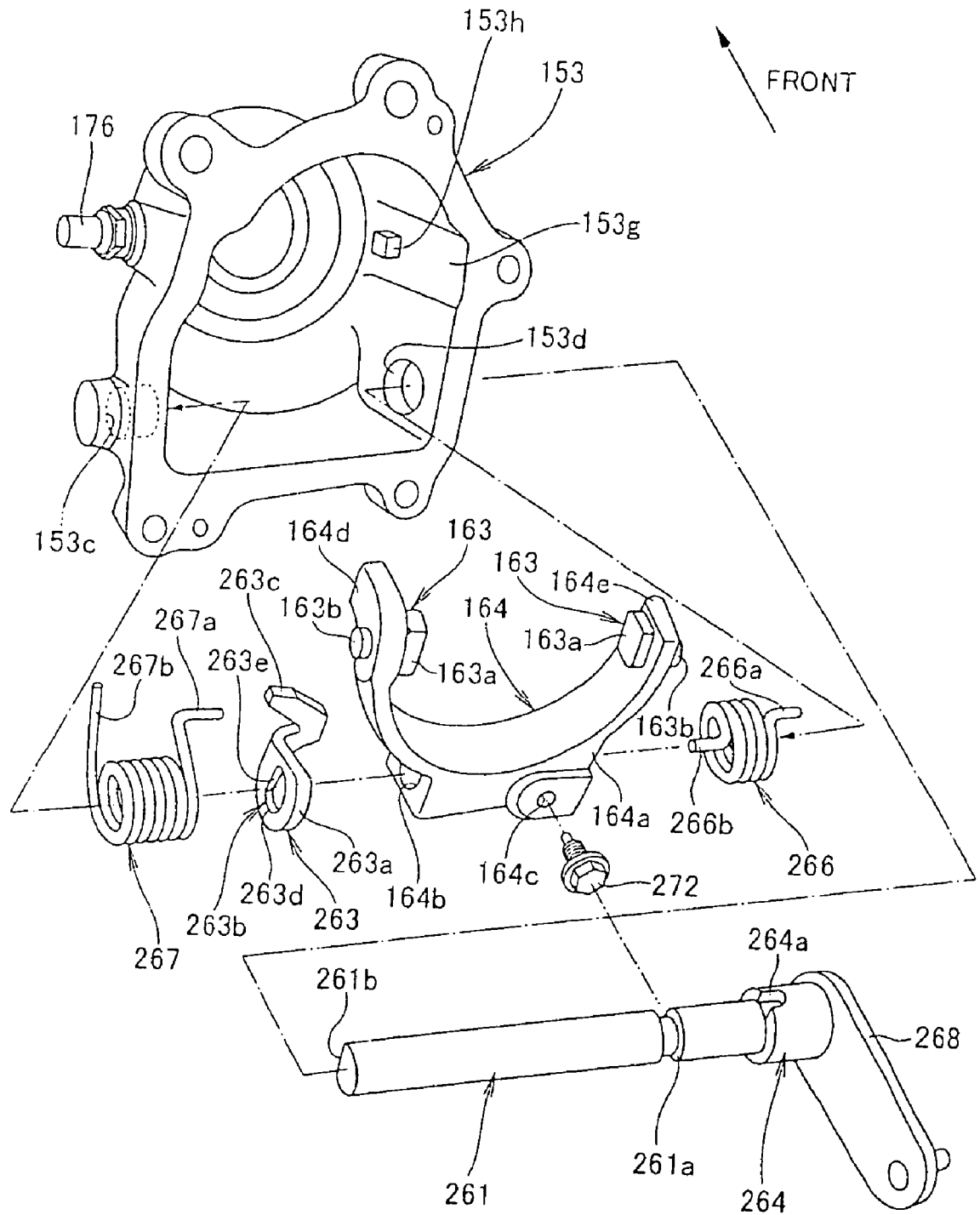
FIG. 6 is an exploded perspective view showing the driving force interrupting mechanism (the first embodiment) according to the invention.

FIG. 6 is an exploded perspective view showing the driving force interrupting mechanism (the first embodiment) according to the invention, and shows that the spindle 261 is inserted into the spindle supporting hole 153d of the first housing 153, is further sequentially inserted into first helical torsion spring 266, the spindle insertion hole 164b of the fork 164, a spindle insertion hole 263b of the stopper member 263 and the second helical torsion spring 267, the end of the spindle 261 is inserted into the spindle supporting hole 153c of the first housing 153, the bolt 272 is screwed to a female screw 164c formed on the fork 164 and the end of the bolt 272 is inserted into an annular groove 261a provided to the spindle 261.

The stopper member 263 is a member which is configured by the flange part 263a and the body 263c of the stopper bent at a substantially right angle with the flange part 263a, through the flange part 263a of which the spindle insertion hole 263b is made and the body 263c of which is formed in a shape (also see FIG. 5) substantially along the first arm 164d to touch the body to the front of the first arm 164d of the fork 164.

The spindle insertion hole 263b is formed in a substantially D type configured by a circular part 263d and a straight part 263e, and the spindle 261 and the stopper member 263 can be integrally rotated by fitting the spindle 261 into the spindle insertion hole 263b so that the straight part 263e is opposite to a planar part 261b provided to a part of the periphery of the spindle 261.

The first helical torsion spring 266 is a member one end 266a of which is inserted into the cutout 264a of the collar 264 and the other end 266b of which is touched to the back 164a of the fork 164.

The second helical torsion spring 267 is a member one end 267a of which is bent and is touched to the front of the body 263c of the stopper and the other end 267b of which is touched to the inner wall 153b (see FIG. 5) of the first housing body 153.

A stopper piece 153h to be touched to the second arm 164e of the fork 164 is formed on the inside face 153g of the first housing body 153.

Figure 7B:
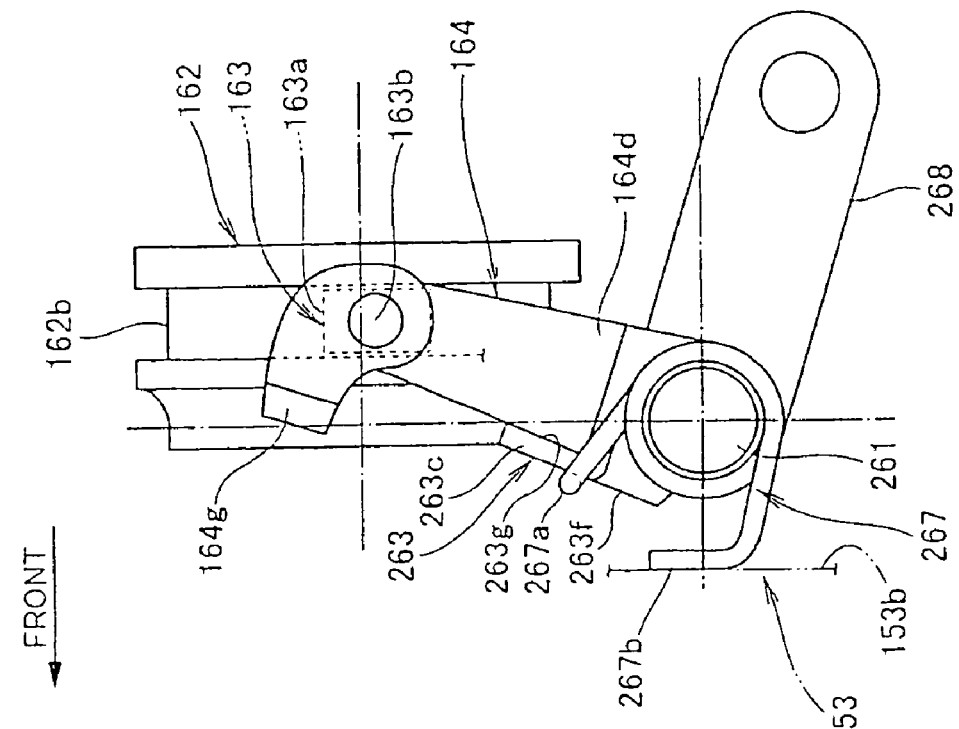
FIGS. 7A and 7B are explanatory drawings for explaining the driving force interrupting mechanism (the first embodiment) according to the invention.
Figure 7A:
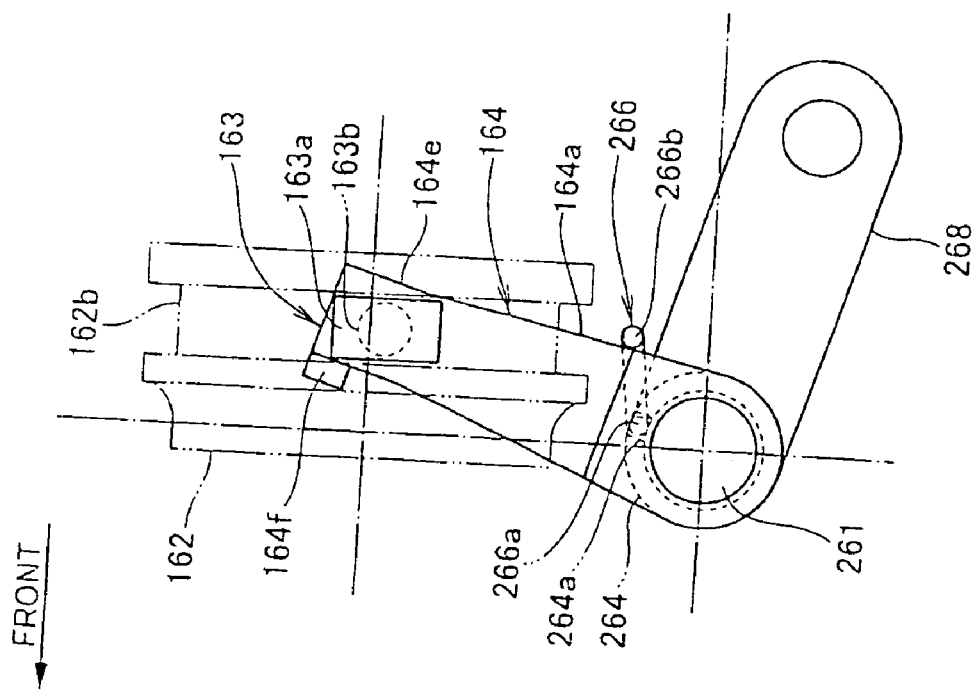

FIGS. 7A and 7B are explanatory drawings for explaining the driving force interrupting mechanism (the first embodiment) according to the invention, FIG. 7A shows a section viewed along a line a-a shown in FIG. 5, and FIG. 7B shows a section viewed along a line b-b shown in FIG. 5.

As shown in FIG. 7A, one end 266a of the first helical torsion spring 266 is located in the cutout 264a of the collar 264, the other end 266b is touched to the back 164a of the fork 164, the fork 164 presses the spindle 261 counterclockwise, and the coupling piece 163 attached to the second arm 164e is located in the peripheral annular groove 162b of the coupling sleeve 162. A reference numeral 164f denotes a protruded piece provided to the end of the second arm 164e and a swing in the first swing direction (in a counterclockwise direction in FIG. 7A) of the fork 164 is regulated by touching the protruded piece to the stopper piece 153h (see FIG. 6) on the side of the first housing body 153 (see FIG. 6).

As shown in FIG. 7B, the fork 164 is pressed on the back 263g of the body 263c of the stopper member 263 by the resilience of the first helical torsion spring 266 (see FIG. 7A), one end 267a of the second helical torsion spring 267 presses the front 263f of the body 263c of the stopper member 263, and the other end 267b presses the inner wall 153b of the first housing body 153. Therefore, the fork 164 is pressed in a second swing direction (in a clockwise direction in FIG. 7B) by the second helical torsion spring 267 with the spindle 261 in the center. A reference numeral 164g denotes an inclined face provided to the end of the first arm 164d of the fork 164 and the inclined face is a part for facilitating pressing a detector of the switch for detecting a position 176 (see FIG. 6) when the fork 164 is swung.

As shown in FIGS. 7A and 7B, the resilience of the first helical torsion spring 266 operates so that the resilience presses the fork 164 on the stopper member 263 against the collar 264 fixed to the spindle 261 and as the stopper member 263 is fixed to the spindle 261, the resilience of the first helical torsion spring 266 operates on only a part between the collar 264 and the stopper member 263.

In addition, the resilience of the second helical torsion spring 267 acts upon the body 153 of the first housing so that the stopper member 263, the fork 164 and the spindle 261 are turned and is force independent of the resilience of the first helical torsion spring 266.

That is, paths when the lever 268 is swung counterclockwise on which force is transmitted are as follows:

(1) the lever 268→the collar 264→the first helical torsion spring 264→the fork 164, (2) the lever 268→the spindle 261→the stopper member 263→the second helical torsion spring 267→the first housing body 153, and the first helical torsion spring 264 and the second helical torsion spring 267 are arranged in parallel.

Next, the action of the above-mentioned driving force interrupting mechanism 170 will be described.

Figure 8B:
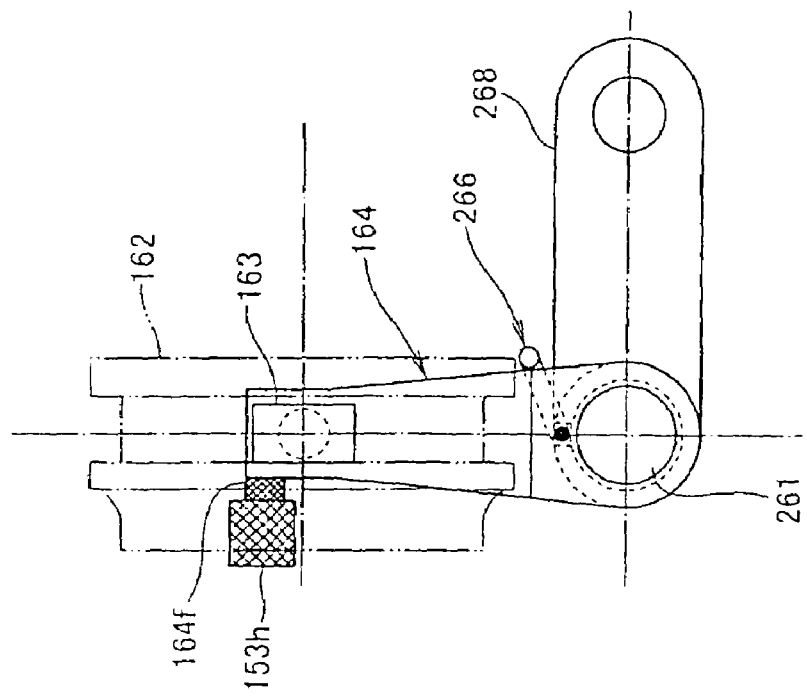
FIGS. 8A and 8B show the first action of the driving force interrupting mechanism (the first embodiment) according to the invention.
Figure 8A:
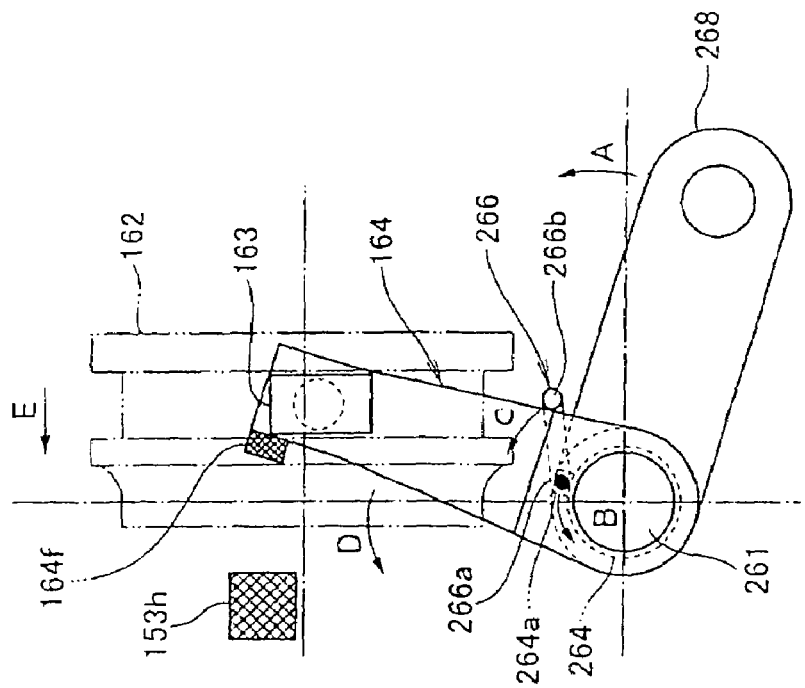

FIGS. 8A and 8B show the first action of the driving force interrupting mechanism (the first embodiment) according to the invention.

As shown in FIG. 8A, when a lever for switching arranged close to a rider's seat of the vehicle for example is operated and the lever 268 is swung in a direction shown by an arrow A via wire, the collar 264 is turned together with the spindle 261 and as one end 266a (shown by a black circle) of the first helical torsion spring 266 hooked on the cutout 264a of the collar 264 is turned in a direction shown by an arrow B, the resilience of the first helical torsion spring 266 is increased. Therefore, the other end 266b of the first helical torsion spring 266 is turned in a direction shown by an arrow C and as the fork 164 is swung in a direction shown by an arrow D as a result, the coupling sleeve 162 is moved in a direction shown by an arrow E along the driving shaft 161 (see FIG. 4) via the coupling piece 163.

As shown in FIG. 8B, when the fork 164 is swung from a state shown in FIG. 8A and the protruded piece 164f of the fork 164 hits on the stopper piece 153h of the first housing body, the swing of the fork 164 is stopped and the movement of the coupling sleeve 162 is also stopped.

Figure 9:
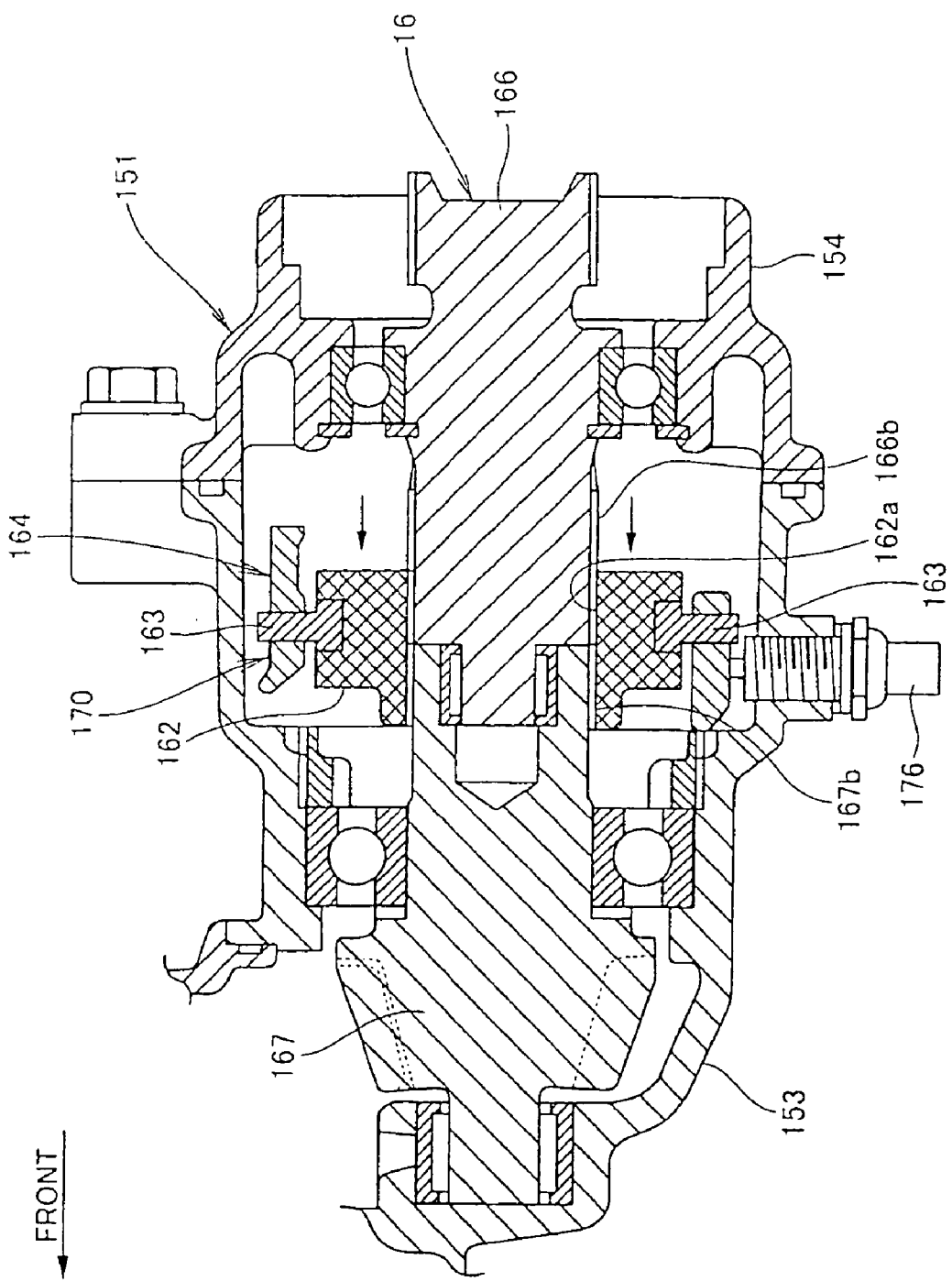
FIG. 9 shows the second action of the driving force interrupting mechanism (the first embodiment) according to the invention.

FIG. 9 shows the second action of the driving force interrupting mechanism (the first embodiment) according to the invention.

As shown in FIG. 8B, when the fork 164 hits on the stopper piece 153h and the movement of the coupling sleeve 162 is stopped, the coupling sleeve 162 is coupled to both the input shaft 166 and the output shaft 167 via each spline and driving force can be transmitted from the input shaft 166 to the output shaft 167 via the coupling sleeve 162.

Figure 10B:
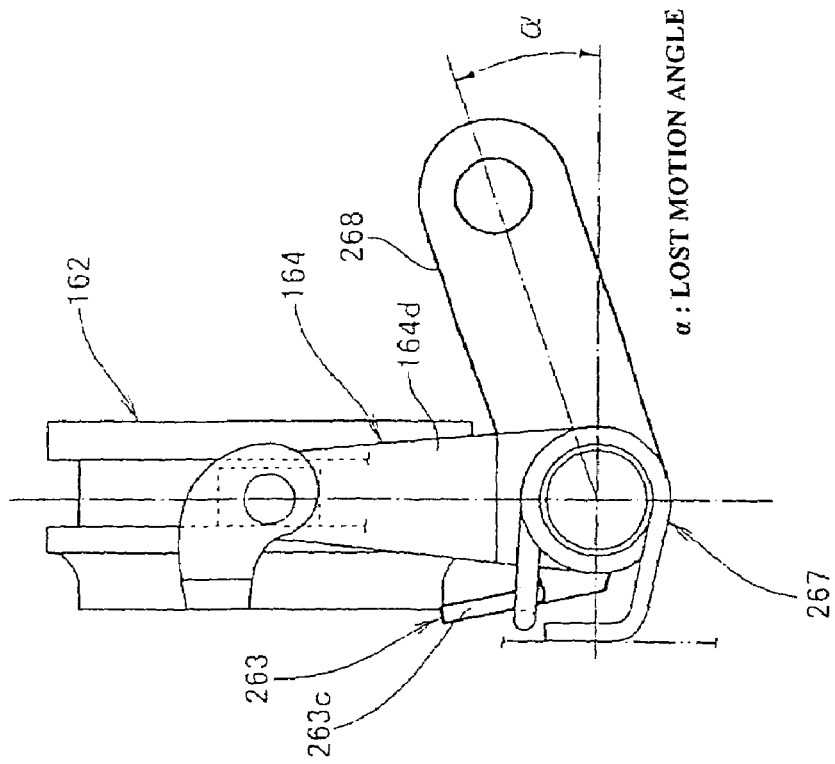
FIGS. 10A and 10B show the third action of the driving force interrupting mechanism (the first embodiment) according to the invention.
Figure 10A:
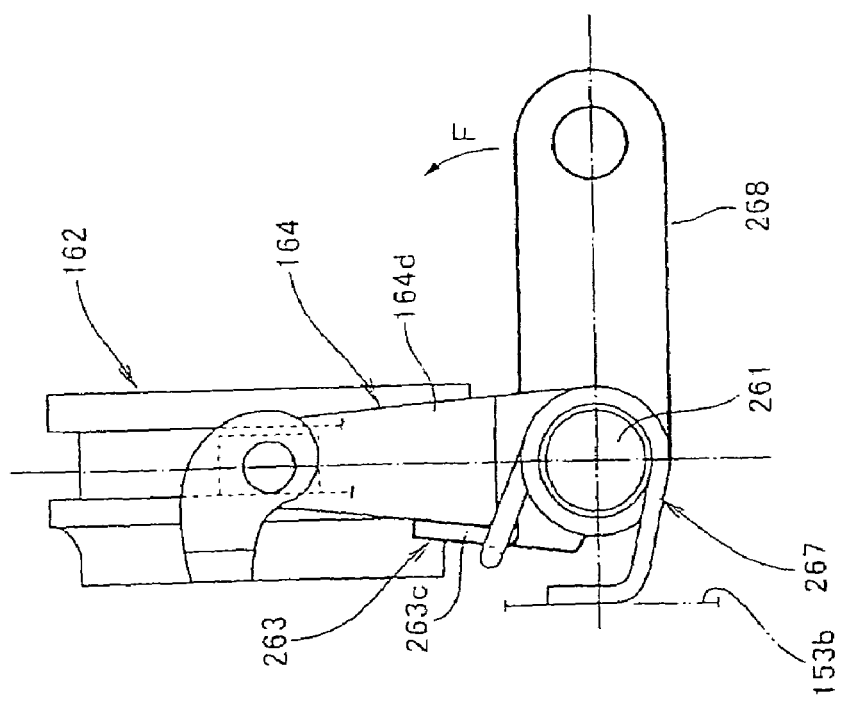

FIGS. 10A and 10B show the third action of the driving force interrupting mechanism (the first embodiment) according to the invention.

FIG. 10A shows the first arm 164d of the fork 164, the stopper member 263 and the second helical torsion spring 267 in a state shown in FIG. 8B. FIG. 10A shows a state in which the fork 164 hits on the body 263c of the stopper member 263. The stopper member 263 and the lever 268 are shown by a thick line (they are similarly shown in FIG. 10B).

When torque is further applied to the lever 268 in a direction shown by an arrow F, the lever 268 is swung by a predetermined angle α against the resilience of the second helical torsion spring 267 as shown in FIG. 10B. The stopper member 263 is also integrally swung with the lever 268 and the body 263c of the stopper separates from the fork 164. The angle α at this time is a lost motion angle and is a range in which the fork 164 is not swung even if the lever 268 is swung, that is, the motion of the fork 164 is lost.

Referring to FIG. 5 again, a lost motion mechanism 280 for generating a lost motion angle described above is configured by the stopper member 263 attached to the spindle 261, the fork 164 attached, to the spindle 261 so that the fork can be swung, the cutout 264a formed through the collar 264, the first helical torsion spring 266 one end 266a of which is inserted into the cutout 264a and the other end 266b of which hits on the back 164a of the fork 164 and the second helical torsion spring 267 one end 267a of which hits on the front 263f (see FIG. 7B) of the stopper member 263 and the other end 267b of which hits on the inner wall 153b of the first housing body 153.

Such a lost motion mechanism 280 largely secures the swung angle of the fork 164 as shown in FIGS. 8A, 8B, 10A and 10B, and makes the protruded piece 164f of the fork 164 securely hit on the stopper piece 153h. In addition, the mechanism prevents excessive force from being applied to an operating system between a lever for switching and the fork 164, even if the lever for switching is operated after the protruded piece 164f hits on the stopper piece 153h. This prevents switching from two-wheel-drive to four-wheel-drive from being disenabled because the coupling sleeve 162 fails to move to a predetermined position because of a dimensional error and an assembly error of each part of the operating system from the lever for switching to the coupling sleeve 162 and the extension of wire when the lever for switching four-wheel-drive and two-wheel-drive arranged close to the rider's seat of the vehicle is operated. The lost motion mechanism operates the lever 268 via the wire, and the fork 164 is swung and the coupling sleeve 162 is moved.

As explained in relation to FIGS. 1, 4, and 5, according to the first aspect of the invention, the driving shaft 161 for transmitting driving force to the side of the front wheels 12, 13 (the front wheel 13 is not shown) or the side of the rear wheels 14, 15 (the rear wheel 15 is not shown) is coupled to the engine 17 as a driving source of the vehicle 10 for running on an uneven road. The driving shaft 161 is configured by the input shaft 166 and the output shaft 167 arranged coaxially with the input shaft 166, the coupling sleeve 162 coupled to one of the input shaft 166 and the output shaft 167 so that the coupling sleeve can be axially moved is moved by the fork 164 so that the coupling sleeve is also coupled to the other of the input shaft 166 and the output shaft 167 and-driving force is transmitted by coupling the input shaft 166 and the output shaft 167 via the coupling sleeve 162 or driving force is disconnected by uncoupling the coupling sleeve 162 from the other of the input shaft 166 and the output shaft 167.

In addition, the spindle 261 as a swinging shaft of the driving force interruption device 170 is rotatably attached to the first housing 156 for supporting the driving shaft 161 so that the driving shaft can be rotated. The fork 164 is attached to the spindle 261 so that the fork can be swung. When the spindle 261 is rotated and the fork 164 is swung to a predetermined position in which the input shaft 166 and the output shaft 167 are coupled (that is, a position of the fork 164 at the time that the protruded piece 164*f* (see FIG. 8B) of the fork 164 hits on the stopper piece 153*h* (see FIG. 8B) of the first housing body 153), the lost motion mechanism 280 provided on the spindle 261 renders further rotation of the spindle 261 to be ineffective in swinging the fork 164.

Since the fork 164 is supported so that the fork can be swung and the lost motion mechanism 280 on the spindle 261 is attached to the first housing 156 so that the spindle 261 can be rotated, cost increases can be kept to a minimum. In addition, by making the driving force interrupting mechanism 170 depend upon the swing of the fork 164, and the configuration is compact and thus space required for the lost motion mechanism 280 can be reduced.

According to the second aspect of the invention, the lost motion mechanism 280 is preferably provided with the first helical torsion spring 266 as a spring between the swinging shaft and the fork for pressing the fork 164 onto the side of a predetermined position, by coupling one end 266*a* to the spindle 261, and touching the other end 266*b* to the face (the back 164*a*) on the reverse side to the predetermined position of the fork 164 (that is, a position in which the protruded piece 164*f* of the fork 164 hits on the stopper piece 163*h* of the first housing body 153). The stopper member 263 is attached to the spindle 261 to regulate the swing to the side of the predetermined position of the fork 164.

The lost motion mechanism is also provided with the second helical torsion spring 267 as a spring between the stopper and the housing for pressing the stopper member 263 onto the reverse side to a predetermined position, by touching one end 267*a* to a face (the front 263*f* (see FIG. 7B)) on the side of the predetermined position (that is, the predetermined position of the fork 164) of the stopper member 263, and touching the other end 267*b* to the inner wall 153*b* of the first housing 156.

The above-mentioned predetermined position of the fork 164 means the end of a swing on the side of the stopper piece 153*h* in a range in which the fork 164 is swung.

The side of the predetermined position of the fork 164 (or the stopper member 263) means the side of the stopper piece 153*h* (that is, the front side of the fork 164 (or the stopper member 263)) of the fork 164 (or the stopper member 263).

The reverse side to the predetermined position of the fork 164 (or the stopper member 263) means the reverse side (that is, the back side of the fork 164 (or the stopper member 263)) to the stopper piece 153*h* of the fork 164 (or the stopper member 263).

As mentioned above, the lost motion mechanism 280 is provided with the first helical torsion spring 266, the stopper member 263 and the second helical torsion spring 267, the first helical torsion spring 266 presses the spindle 261 so that the fork 164 hits on the stopper member 263 and the second helical torsion spring 267 presses the stopper member 263 and the spindle 261 on the first housing 156, the resilience of the first helical torsion spring 266 and the resilience of the second helical torsion spring 267 are independent on the boundary of the stopper member 263, the resilience of one having no effect on the other.

Thus, the resilience of the respective springs 266, 267 can be separately designed, and a degree of freedom in designing the driving force interrupting mechanism 170 can be enhanced.

Figure 11:
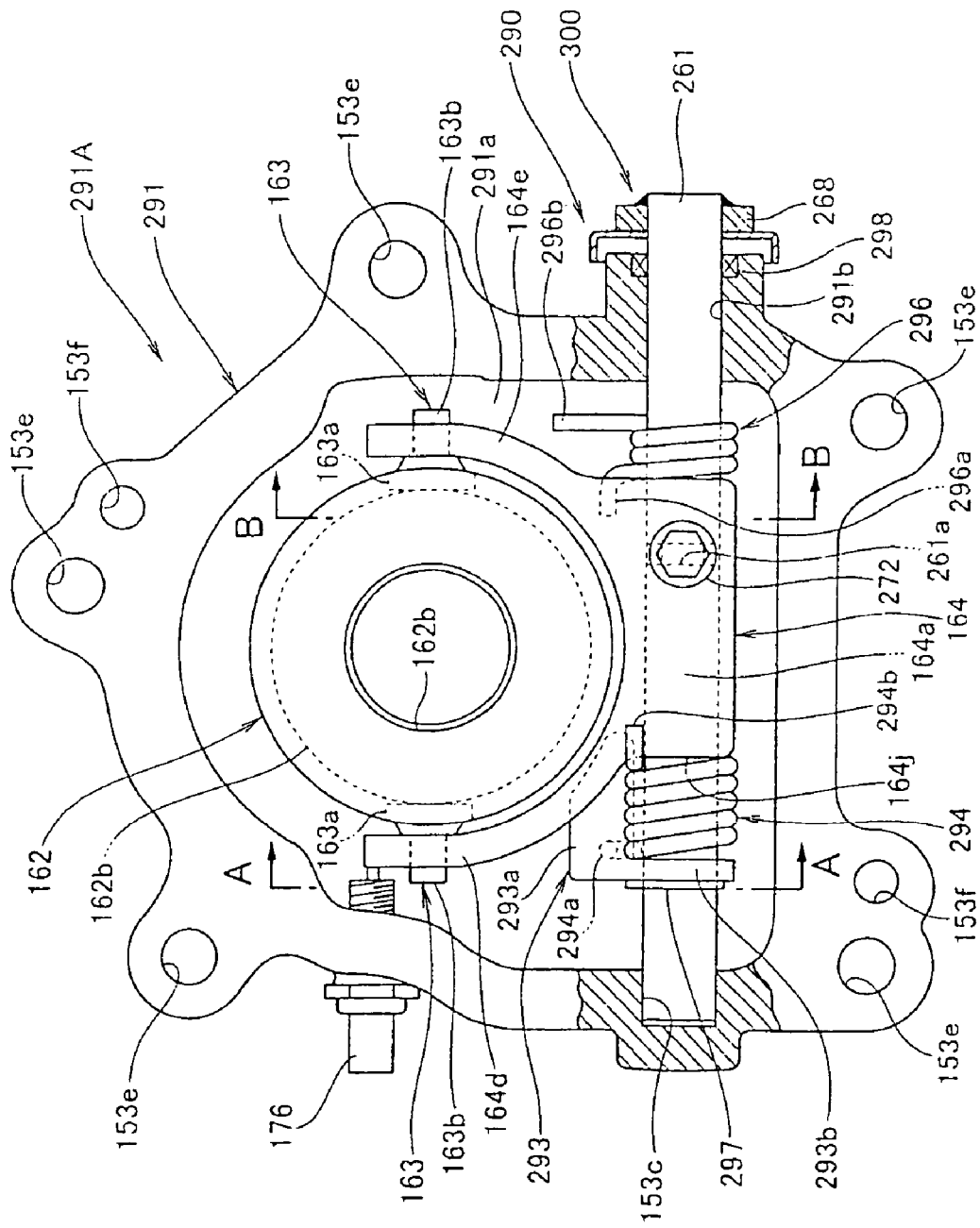
FIG. 11 is a back view showing a driving force interrupting mechanism (a second embodiment) according to the invention.

FIG. 11 is a back view showing a driving force interrupting mechanism (a second embodiment) according to the invention, the same reference numerals are allocated to the same configuration as the configuration in the first embodiment shown in FIG. 5, and the detailed description is omitted.

The driving force interrupting mechanism 290 is provided with a spindle 261 attached to the body 291 of a first housing (a member configuring the first housing 291A together with a first housing cover 154 (see FIG. 4)) so that the spindle can be rotated, and a fork 164 attached to the spindle 261 so that the fork can be swung, a stopper member 293 integrated with the spindle 261 to regulate a swing in a first swing direction of the fork 164 (that is, a swing direction of the fork 164 in which a coupling sleeve 162 is moved to couple an input shaft 166 (see FIG. 4) and an output shaft 167 (see FIG. 4)).

Also included are a first helical torsion spring 294 one end 294*a* of which is touched to the front of the body 293*a* of the stopper member 293 and the other end 294*b* (located on the side of the side 164*j* of the fork 164) of which is touched to the back 164*a* of the fork 164, a second helical torsion spring 296 one end 296*a* of which is touched to the front 164*k* (not shown) of the fork 164 and the other end 296*b* of which is touched to an inner wall 291*a* of the first housing 291, a lever 268, coupling pieces 163, 163 and the coupling sleeve 162.

The body 291 of the first housing is different from the first housing body 153 (see FIG. 5) only in a hole 291*b* for supporting the spindle 261 so that the spindle can be rotated.

The stopper member 293 is provided with a flange part 293*b* fitted to the spindle 261 and the body 293*a* of the stopper integrally bent from the flange part 293*b*. A reference numeral 297 denotes a snap ring for preventing the stopper member 293 from being detached from the spindle 261 and 298 denotes an oil seal.

Figure 12B:
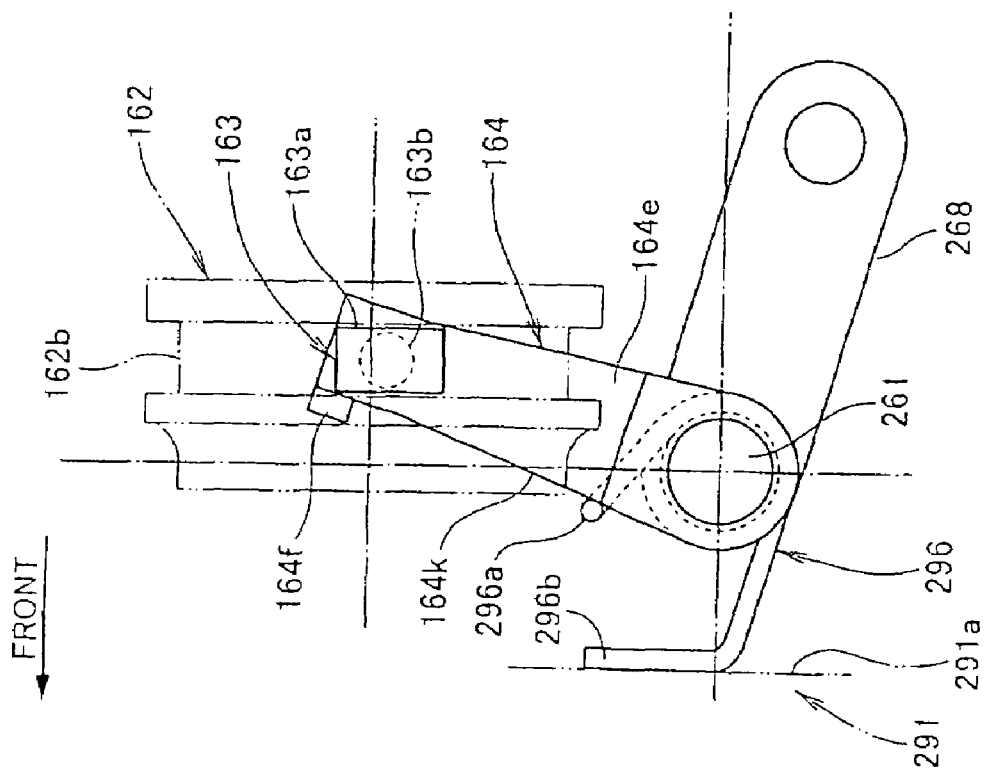
FIGS. 12A and 12B are explanatory drawings for explaining the driving force interrupting mechanism (the second embodiment) according to the invention.
Figure 12A:
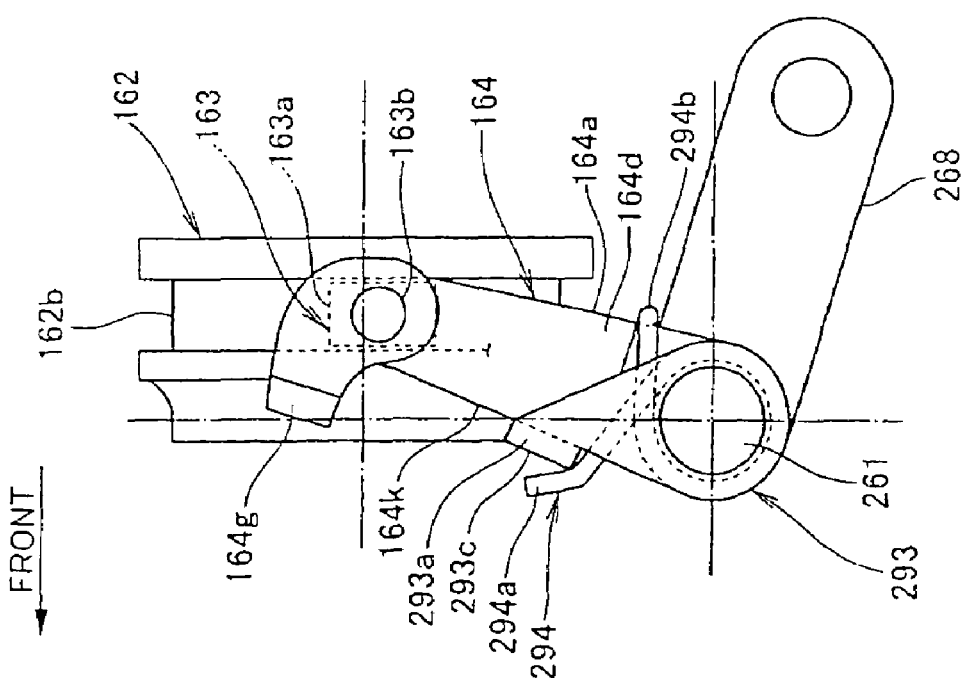

FIGS. 12A and 12B are explanatory drawings for explaining the driving force interrupting mechanism (the second embodiment) according to the invention, FIG. 12A shows a section viewed along a line A-A shown in FIG. 11, and FIG. 12B shows a section viewed along a line B-B shown in FIG. 11.

As shown in FIG. 12A, one end 294*a* of the first helical torsion spring 294 is touched to a lower edge of the front 293*c* of the body 293*a* which is a bent part of the stopper in the stopper member 293. The other end 294*b* is hooked on the back 164*a* of the fork 164. The stopper member 293 is pressed clockwise with the spindle 261 in the center by the resilience of the first helical torsion spring 294 and is in a state in which the stopper member is pressed on the fork 164, specifically on the front 164*k* of a first arm 164*d*. The coupling piece 163 attached to the first arm 164*d* is located in a peripheral annular groove 162*b* of the coupling sleeve 162.

As shown in FIG. 12B, one end 296*a* of the second helical torsion spring 296 touches on the fork 164, specifically on the front 164*k* of a second arm 164*e*, the other end 296*b* touches on the inner wall 291*a* of the body 291 of the first housing, and the fork 164 is pressed clockwise with the spindle 261 in the center.

As shown in FIGS. 12A and 12B, a path of the transmission of force when the lever 268 is swung counterclockwise is the lever 268→the spindle 261→the stopper member 293→the first helical torsion spring 294→the fork 164→the second helical torsion spring 296→the body 291 of the first housing, and the first helical torsion spring 294 and the second helical torsion spring 296 are arranged in series.

FIGS. 13A and 13B show the third action of the driving force interrupting mechanism (the second embodiment) according to the invention.

As shown in FIG. 13A, when the lever 268 swings in a direction shown by an arrow H, the stopper member 293 swings in a direction shown by an arrow J together with the spindle 261, and one end 294a of the first helical torsion spring 294 also swings. Hereby, as the first helical torsion spring 294 twists, the resilience is gradually increased, and as the resilience is larger than the resilience of the second helical torsion spring 296 (see FIG. 12B), the other end 294b of the first helical torsion spring 294 turns in a direction shown by an arrow K. As the fork 164 is swung in a direction shown by an arrow L, the coupling sleeve 162 moves in a direction shown by an arrow M along a driving shaft via the coupling piece 163.

As shown in FIG. 13B, when the fork 164 is swung from a state shown in FIG. 13A, and a protruded piece 164f of the fork 164 hits on the stopper piece 153h of the first housing body, a swing of the fork 164 stops and the movement of the coupling sleeve 162 also stops.

Figure 14B:
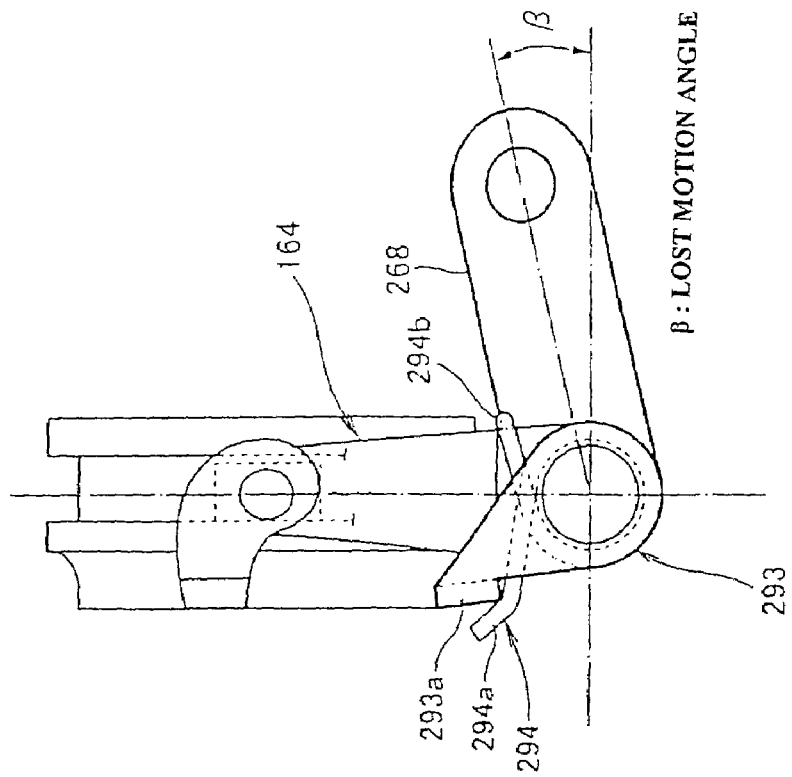
FIGS. 14A and 14B show the second action of the driving force interrupting mechanism (the second embodiment) according to the invention.
Figure 14A:
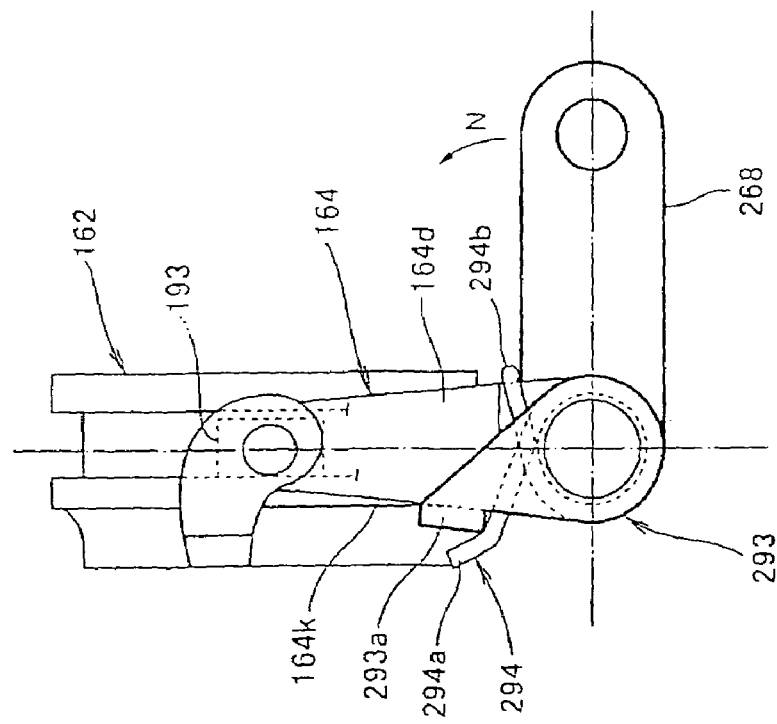

FIGS. 14A and 14B show the second action of the driving force interrupting mechanism (the second embodiment) according to the invention.

FIG. 14A shows the first arm 164d of the fork 164, the stopper member 293 and the first helical torsion spring 294 in a state shown in FIG. 13B. The body 293a of the stopper member 293 touches to the front 164k of the first arm 164d. The stopper member 293 and the lever 268 are shown by a thick line (also similar in FIG. 14B).

When torque is applied to the lever 268 in a direction shown by an arrow N, the lever 268 is swung by a predetermined angle β against the resilience of the first helical torsion spring 294 as shown in FIG. 14B. At this time, the body 293a of the stopper member 293 is swung integrally with the lever 268 and is separated from the fork 164. The angle β at this time is a lost motion angle.

Referring to FIG. 11 again, a lost motion mechanism 300 for generating the lost motion angle is configured by the stopper member 293 attached to the spindle 261, and the fork 164 attached to the spindle 261 so that the fork can be swung. One end 294a of the first helical torsion spring 294 touches the front of the stopper member 293, and the other end 294b hooks on the back 164a of the fork 164, and One end 296a of the second helical torsion spring 296 touches the front 164k (see FIG. 12B) of the fork 164, and the other end 296b touches the inner wall 291a of the body 291 of the first housing.

As explained in relation to FIGS. 11, and 12, according to the second aspect of the invention, the lost motion mechanism 300 is provided with the stopper member 293 attached to the spindle 261 to regulate a swing to the side of a predetermined position (that is, a position in which the protruded piece 164f of the fork 164 hits on the stopper piece 153h (see FIG. 13B) of the body 291 of the first housing) of the fork 164. The first helical torsion spring 294 for pressing the fork 164 on the side of the predetermined position when the stopper member 293 is swung to the side of the predetermined position by touching one end 294a to the face (the front 293c) on the side of the predetermined position of the stopper member 293 and coupling the other end 294b to the fork 164. The second helical torsion spring 296 for pressing the fork 164 on the reverse side to the predetermined position by touching one end 296a to the face (the front 164k) on the side of the predetermined position of the fork 164 and touching the other end 296b to the inner wall 291a of the body 291 of the first housing.

Since the lost motion mechanism 300 is provided with the stopper member 293, the first helical torsion spring 294 and the second helical torsion spring 296 and each end of the first helical torsion spring 294 and the second helical torsion spring 296 is not fixed to the spindle 261, no groove, no hole, no cutout, no pin and no projection are required to be provided to the spindle 261.

Thus, the spindle 261 can be formed in a simple straight shape, and the lost motion mechanism 300 can be formed in simple structure. Therefore, the manufacturing cost of the lost motion mechanism 300 can be reduced.

In these embodiments, as shown in FIGS. 4, 5 and 11, the lost motion mechanisms 280, 300 are provided to the driving force interrupting mechanisms 170, 290, however, the invention is not limited to these, and a lost motion mechanism may be also provided to the differential locking device 193.

Further, as shown in FIG. 11, the other end 294b of the first helical torsion spring 294 touches the back 164a of the fork 164. However, the invention is not limited to this. Alternatively, a lateral hole may be made on the side 164j of the fork 164, and the other end 294b of the first helical torsion spring 294 may be also inserted into the lateral hole.

The driving force interrupting mechanism according to the invention is suitable for a four-wheel drive vehicle that can switch to a two-wheel-drive mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving force interrupting mechanism where a driving shaft for transmitting driving force to the side of a front wheel or to the side of a rear wheel is coupled to a driving source of a vehicle, the driving shaft is configured by an input shaft and an output shaft coaxial with the input shaft, a coupling sleeve coupled to one of the input shaft and the output shaft so that the coupling sleeve can be axially moved is moved by a fork so that the coupling sleeve is also coupled to the other of the input shaft and the output shaft, and driving force is transmitted by coupling the input shaft and the output shaft via the coupling sleeve, or driving force is disconnected by uncoupling the coupling sleeve from the other of the input shaft and the output shaft, the driving force interrupting mechanism comprising:

a swinging shaft rotatably attached to a housing for supporting the driving shaft so that the driving shaft can rotate;

the fork being attached to the swinging shaft so that the fork can swing; and a lost motion mechanism provided on the swinging shaft, the lost motion mechanism adapted to render further rotation of the swinging shaft ineffective in swinging the fork when the swinging shaft has been rotated and the fork has been swung to a predetermined position in which the input shaft and the output shaft are coupled, wherein: the lost motion mechanism further comprises:

a spring between the swinging shaft and the fork for pressing the fork on a side of the predetermined position by coupling one end to the swinging shaft and touching the other end to a face on the reverse side to the predetermined position of the fork;

a stopper member attached to the swinging shaft to regulate a swing to the side of the predetermined position of the fork; and a spring between the stopper and the housing for pressing the stopper member on a reverse side to the predetermined position by touching one end of the spring to a face on the side of the predetermined position of the stopper member and by touching another end of the spring to an inner wall of the housing.

2. A driving force interrupting mechanism according to claim 1, wherein: the lost motion mechanism further comprises:

a stopper member attached to the swinging shaft to regulate a swing to a side of the predetermined position of the fork;

a spring between the stopper and the fork for pressing the fork on the side of the predetermined position when the stopper member is swung to the side of the predetermined position by touching one end of the spring to a face on the side of the predetermined position of the stopper member, and coupling another end of the spring to the fork; and a spring between the fork and the housing for pressing the fork on a reverse side to the predetermined position by touching one end of the spring to a face on the side of the predetermined position of the fork and touching the other end of the spring to an inner wall of the housing.

3. A driving force interrupting mechanism according to claim 2, wherein the spring between the stopper member and the fork is a first helical torsion spring, and the spring between the stopper member and the housing is a second helical torsion spring.

4. A driving force interrupting mechanism according to claim 3, wherein one end of the first helical torsion spring touches on a lower edge of a front of the stopper member, and another end is hooked on a back of the fork.

5. A driving force interrupting mechanism according to claim 4, wherein the stopper member is pressed clockwise with the swinging shaft in a center by resilience of the first helical torsion spring, is in a state in which the stopper member is pressed on a front of a first arm of the fork.

6. A driving force interrupting mechanism according to claim 3, wherein one end of the second helical torsion spring touches on a front of a second arm of the fork, and another end touches on an inner wall of the of the housing, and the fork is pressed clockwise with the swinging shaft in a center.

7. A driving force interrupting mechanism according to claim 1, wherein the lost motion mechanism secures a predetermined swing angle of the fork and makes a protruded piece of the fork securely hit on a stopper member, thereby preventing excessive force from being applied to an operating system between a lever for switching and the fork, even if the lever for switching is operated after the protruded piece hits on the stopper member.

8. A driving force interrupting mechanism according to claim 1, wherein the spring between the swinging shaft and the fork is a first helical torsion spring, and the spring between the stopper member and the housing is a second helical torsion spring.

9. A driving force interrupting mechanism according to claim 8, wherein the lost motion mechanism is adapted to generate a lost motion angle, the fork is attached to the swinging shaft so that the fork can swing, a cutout is formed through a collar, and wherein the first helical torsion spring includes one end which is inserted into the cutout and another end which hits on a back of the fork, and the second helical torsion spring includes one end which hits on a front of the stopper member and another end which hits on an inner wall of the housing.

10. A driving force interrupting mechanism where a driving shaft for transmitting driving force to the side of a front wheel or to the side of a rear wheel is coupled to a driving source of a vehicle, the driving shaft is configured by an input shaft and an output shaft coaxial with the input shaft, a coupling sleeve coupled to one of the input shaft and the output shaft so that the coupling sleeve can be axially moved is moved by a U-shaped fork so that the coupling sleeve is also coupled to the other of the input shaft and the output shaft, and driving force is transmitted by coupling the input shaft and the output shaft via the coupling sleeve, or driving force is disconnected by uncoupling the coupling sleeve from the other of the input shaft and the output shaft, the driving force interrupting mechanism comprising:

a spindle rotatably attached to an input side housing for supporting the driving shaft so that the driving shaft can rotate;

the U-shaped fork being attached to the spindle so that the U-shaped fork can swing; and a lost motion mechanism provided on the spindle, the lost motion mechanism adapted to render further rotation of the spindle ineffective in swinging the U-shaped fork when the spindle has been rotated and the U-shaped fork has been swung to a predetermined position in which the input shaft and the output shaft are coupled, wherein the lost motion mechanism further comprises:

a stopper member attached to the spindle to regulate a swing to a side of the predetermined position of the U-shaped fork;

a spring between the stopper and the U-shaped fork for pressing the U-shaped fork on the side of the predetermined position when the stopper member is swung to the side of the predetermined position by touching one end of the spring to a face on the side of the predetermined position of the stopper member, and coupling another end of the spring to the U-shaped fork; and a spring between the U-shaped fork and the housing for pressing the U-shaped fork on a reverse side to the predetermined position by touching one end of the spring to a face on the side of the predetermined position of the U-shaped fork and touching the other end of the spring to an inner wall of the housing.

11. A driving force interrupting mechanism according to claim 10, wherein:

the lost motion mechanism further comprises:

a spring between the spindle and the U-shaped fork for pressing the U-shaped fork on a side of the predetermined position by coupling one end to the spindle and touching the other end to a face on the reverse side to the predetermined position of the U-shaped fork;

a stopper member attached to the spindle to regulate a swing to the side of the predetermined position of the U-shaped fork; and a spring between the stopper and the housing for pressing the stopper member on a reverse side to the predetermined position by touching one end of the spring to a face on the side of the predetermined position of the stopper member and by touching another end of the spring to an inner wall of the housing.

12. A driving force interrupting mechanism according to claim 11, wherein the spring between the spindle and the U-shaped fork is a first helical torsion spring, and the spring between the stopper member and the housing is a second helical torsion spring.

13. A driving force interrupting mechanism according to claim 12, wherein the lost motion mechanism is adapted to generate a lost motion angle, the U-shaped fork is attached to the spindle so that the U-shaped fork can swing, a cutout is formed through a collar, and wherein the first helical torsion spring includes one end which is inserted into the cutout and another end which hits on a back of the U-shaped fork, and the second helical torsion spring includes one end which hits on a front of the stopper member and another end which hits on an inner wall of the housing.

14. A driving force interrupting mechanism according to claim 10, wherein the lost motion mechanism secures a predetermined swing angle of the U-shaped fork and makes a protruded piece of the U-shaped fork securely hit on a stopper member, thereby preventing excessive force from being applied to an operating system between a lever for switching and the U-shaped fork, even if the lever for switching is operated after the protruded piece hits on the stopper member.

15. A driving force interrupting mechanism according to claim 10, wherein the spring between the stopper member and the U-shaped fork is a first helical torsion spring, and the spring between the U-shaped fork and the housing is a second helical torsion spring.

16. A driving force interrupting mechanism according to claim 15, wherein one end of the first helical torsion spring touches on a lower edge of a front of the stopper member, and another end is hooked on a back of the U-shaped fork.

17. A driving force interrupting mechanism according to claim 16, wherein the stopper member is pressed clockwise with the spindle in a center by resilience of the first helical torsion spring, is in a state in which the stopper member is pressed on a front of a first arm of the U-shaped fork.

18. A driving force interrupting mechanism according to claim 15, wherein one end of the second helical torsion spring touches on on a front of a second arm of the U-shaped fork, and another end touches on an inner wall of the of the housing, and the U-shaped fork is pressed clockwise with the spindle in a center.

19. A driving force interrupting mechanism where a driving shaft for transmitting driving force to the side of a front wheel or to the side of a rear wheel is coupled to a driving source of a vehicle, the driving shaft is configured by an input shaft and an output shaft coaxial with the input shaft, a coupling sleeve coupled to one of the input shaft and the output shaft so that the coupling sleeve can be axially moved is moved by a U-shaped fork so that the coupling sleeve is also coupled to the other of the input shaft and the output shaft, and driving force is transmitted by coupling the input shaft and the output shaft via the coupling sleeve, or driving force is disconnected by uncoupling the coupling sleeve from the other of the input shaft and the output shaft, the driving force interrupting mechanism comprising:

a spindle rotatably attached to an input side housing for supporting the driving shaft so that the driving shaft can rotate;

the U-shaped fork being attached to the spindle so that the U-shaped fork can swing; and a lost motion mechanism provided on the spindle, the lost motion mechanism adapted to render further rotation of the spindle ineffective in swinging the U-shaped fork when the spindle has been rotated and the U-shaped fork has been swung to a predetermined position in which the input shaft and the output shaft are coupled, wherein the lost motion mechanism secures a predetermined swing angle of the U-shaped fork and makes a protruded piece of the U-shaped fork securely hit on a stopper member, thereby preventing excessive force from being applied to an operating system between a lever for switching and the U-shaped fork, even if the lever for switching is operated after the protruded piece hits on the stopper member.

20. A driving force interrupting mechanism according to claim 19, wherein the lost motion mechanism further comprises:

a spring between the swinging shaft and the fork for pressing the fork on a side of the predetermined position by coupling one end to the swinging shaft and touching the other end to a face on the reverse side to the predetermined position of the fork;

a stopper member attached to the swinging shaft to regulate a swing to the side of the predetermined position of the fork; and a spring between the stopper and the housing for pressing the stopper member on a reverse side to the predetermined position by touching one end of the spring to a face on the side of the predetermined position of the stopper member and by touching another end of the spring to an inner wall of the housing.

\* \* \* \* \*